United States Patent [19]

McMath et al.

[11] 4,030,524
[45] June 21, 1977

[54] COUPLER

[75] Inventors: Jack Alan McMath, Fort Thomas, Ky.; Paul R. Wilder, Cincinnati, Ohio; Larry Lee Alderson, Valley Center, Kans.

[73] Assignee: Dover Corporation, New York, N.Y.

[22] Filed: May 19, 1975

[21] Appl. No.: 578,505

[52] U.S. Cl. .................. 137/614.06; 251/149.9
[51] Int. Cl.² ................... F16L 29/00; F16L 37/28
[58] Field of Search ............ 137/614.06; 251/149.9

[56] References Cited

UNITED STATES PATENTS

| 3,479,005 | 11/1969 | DeGraaf | 137/614.06 X |
| 3,664,634 | 5/1972 | Guertin et al. | 137/614.06 X |
| 3,818,939 | 6/1974 | Buseth | 137/614.06 |
| 3,884,448 | 5/1975 | Millar | 251/149.9 |
| 3,897,091 | 7/1975 | McMath | 137/614.06 X |

*Primary Examiner*—William R. Cline
*Attorney, Agent, or Firm*—John G. Schenk

[57] ABSTRACT

A dry break coupler of a coupling device has an adapter connected thereto in an arrangement in which the adapter must be disposed within the coupler in the position in which it is locked to the coupler before a rotatable shaft can be rotated to initially lock the adapter to the coupler. The coupler has a poppet valve, which opens a valve in a passage in the adapter when the poppet valve is opened to provide communication therebetween, movable to its open position by the rotatable shaft only after the adapter has been locked to the coupler. The adapter cannot be released from the coupler until after the poppet valve has been moved from its open position to its closed position by rotation of the rotatable shaft in the opposite direction.

19 Claims, 11 Drawing Figures

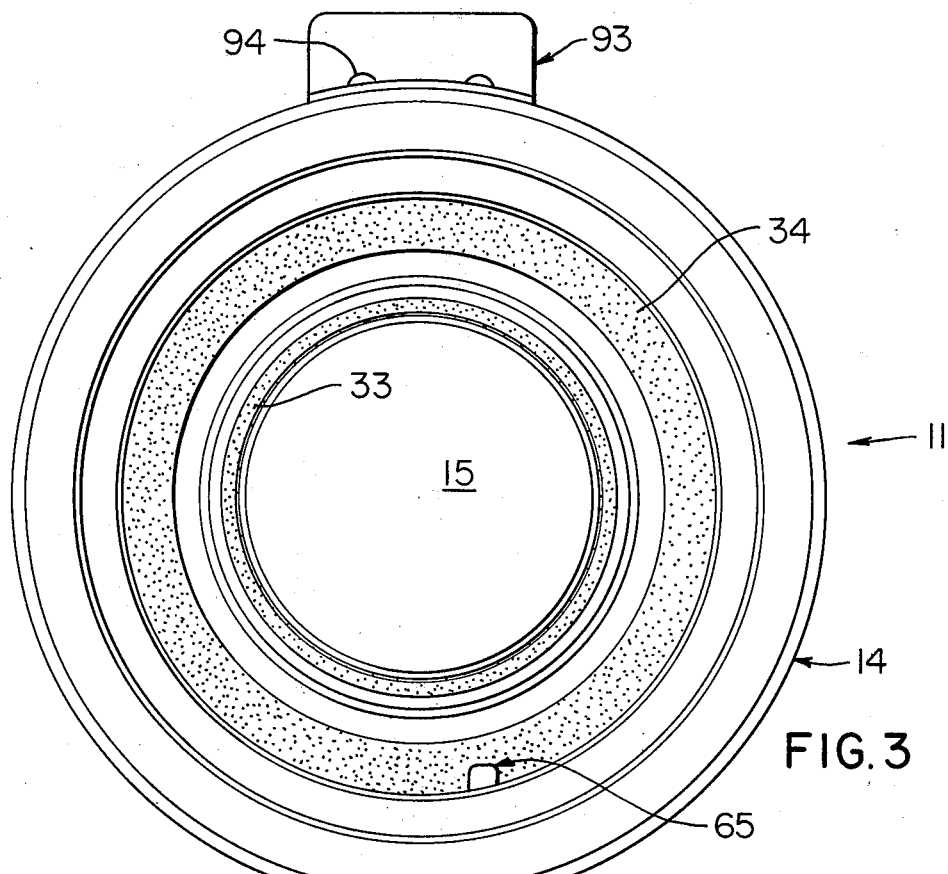
FIG. 3
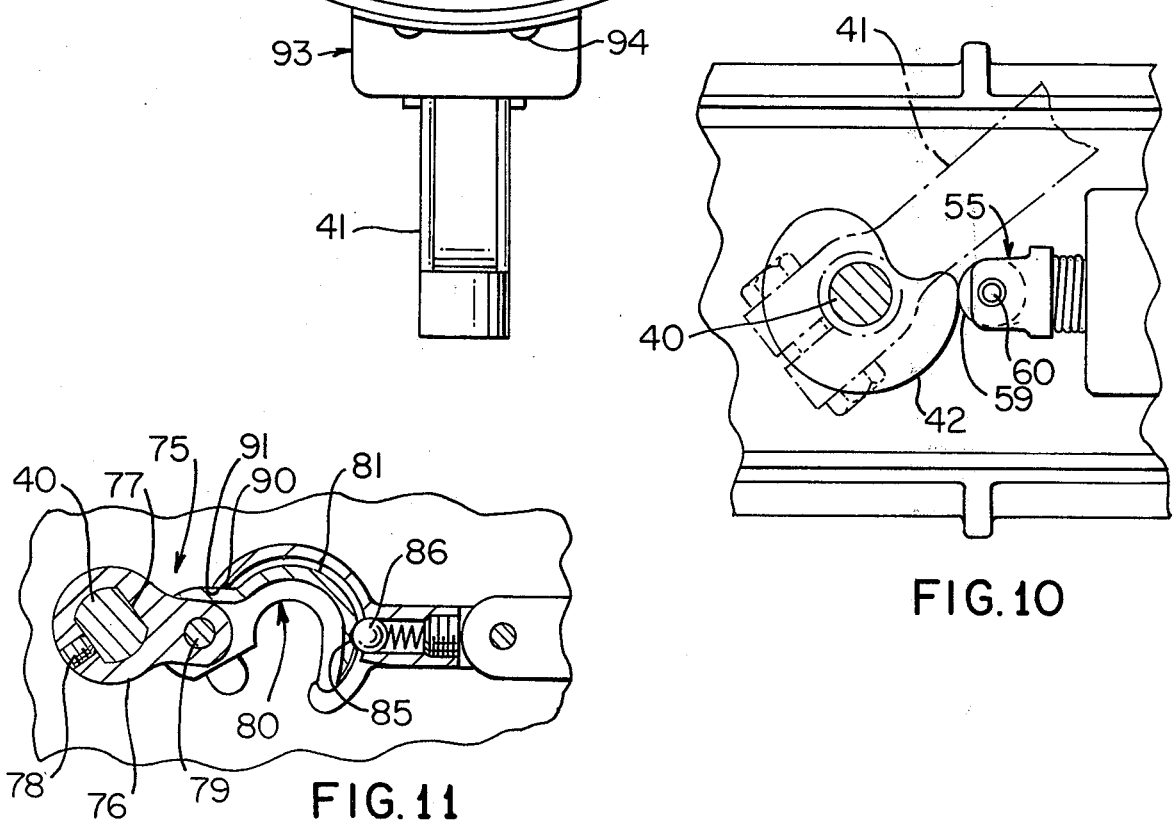
FIG. 10
FIG. 11

COUPLER

SUMMARY OF THE INVENTION

In the handling of dangerous fluids such as gasoline, for example, it is desirable to be able to supply the gasoline from a supply tank to a truck, for example, without any inadvertent loss of the gasoline. Accordingly, a loading device of the supply tank has a coupler for receiving an adapter on the truck to which the gasoline is to be supplied from the supply tank through the coupler and the adapter.

Various arrangements have been proposed to insure that there is no loss of gasoline if the adapter should cease to be connected to the coupler. With the gasoline being supplied under pressure to the truck, a relatively large quantity of gasoline can be lost in a very short period of time if there should be any accidental disconnection of the adapter from the coupler.

The present invention provides coupler in which the adapter is locked to the coupler so that the adapter cannot be released from the coupler as long as the poppet valve in the coupler is open to allow fluid to flow therethrough. Accordingly, the adapter cannot be accidentally disconnected from the coupler without the poppet valve being closed.

The present invention also prevents accidental opening of the poppet valve in the coupler unless an adapter is locked to the coupler. Thus, the present invention insures that the adapter must be locked to the coupler before the poppet valve in the coupler can be opened and that the adapter cannot be unlocked from the coupler without the poppet valve being closed so that there cannot be any loss of fluid by the coupler of the present invention through accidental disconnection of the adapter from the coupler.

An object of this invention is to provide a unique dry break coupler.

Another object of this invention is to provide a coupler in which fluid flow can occur through the coupler only after an adapter is locked to the coupler.

A further object of this invention is to provide a coupler in which an adapter cannot be released from the coupler until fluid flow is stopped.

An additional object of this invention is to provide a unique linkage mechanism for changing rotary motion to linear motion.

Other objects, uses, and advantages of this invention are apparent upon a reading of this specification, which proceeds with reference to the drawings forming part thereof and wherein:

BRIEF DESCRIPTION OF THE DRAWINGS

FIG. 3 is an end elevational view of the coupler of FIG. 1 taken from the right hand side of FIG. 1.

FIG. 10 is a fragmentary elevational view of a portion of the coupler of FIG. 9 and similar to FIGS. 2 and 7 but taken along line 10—10 of FIG. 9 to show the position of the cam when the adapter is locked to the coupler and the poppet valve of the coupler is open.

FIG. 11 is a fragmentary sectional view of the linkage assembly for connecting the poppet valve of the coupler to the actuating shaft and similar to FIGS. 4 and 8 but taken along line 11—11 of FIG. 9.

DESCRIPTION OF THE ILLUSTRATED EMBODIMENT

Figure 1:
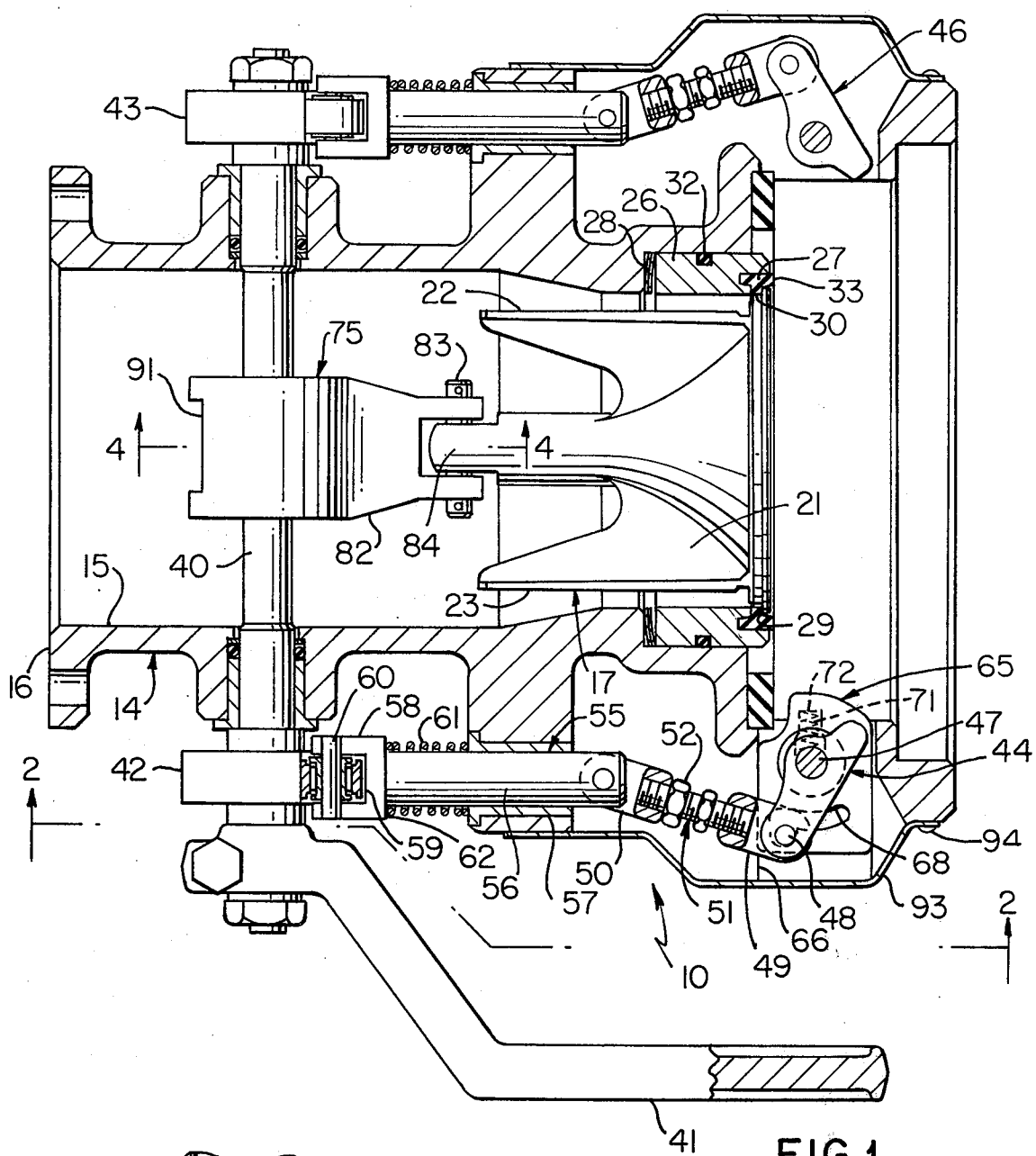
FIG. 1 is a longitudinal sectional view, partly in elevation, of the coupler of the present invention without an adapter being received therein.
Figure 5:
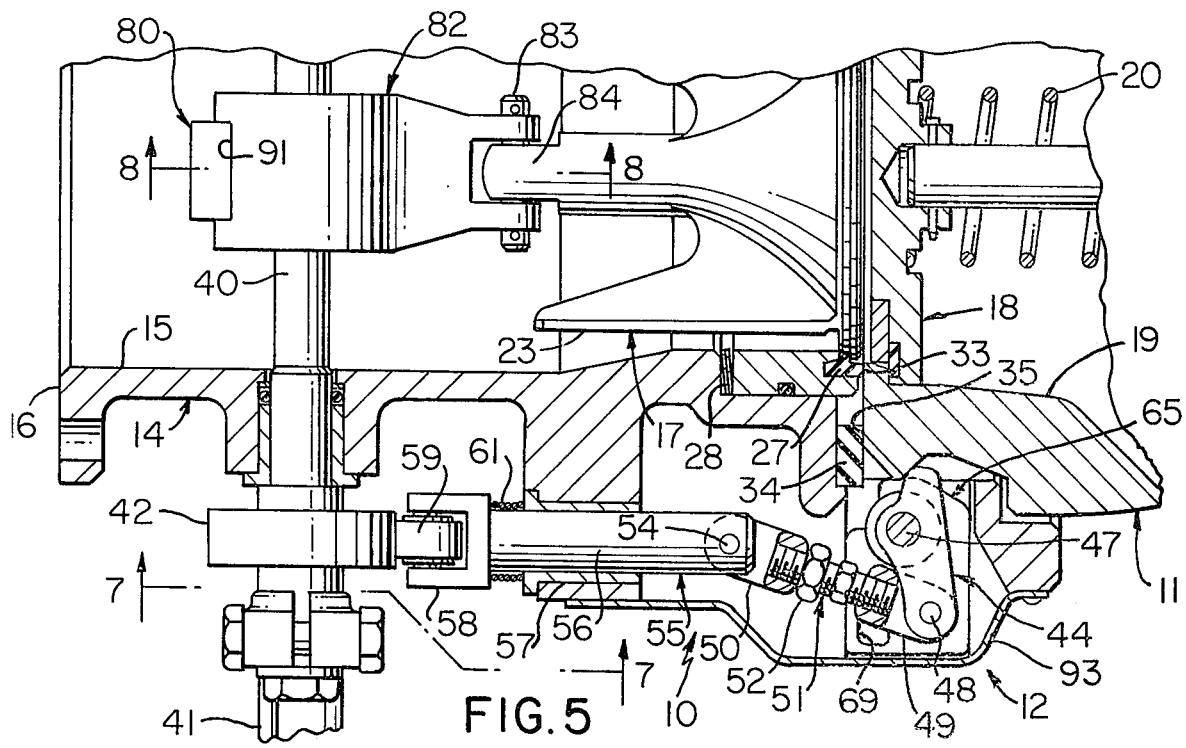
FIG. 5 is a fragmentary longitudinal sectional view, partly in elevation, of the coupler and similar to FIG. 1 but showing an adapter locked within the coupler.
Figure 9:
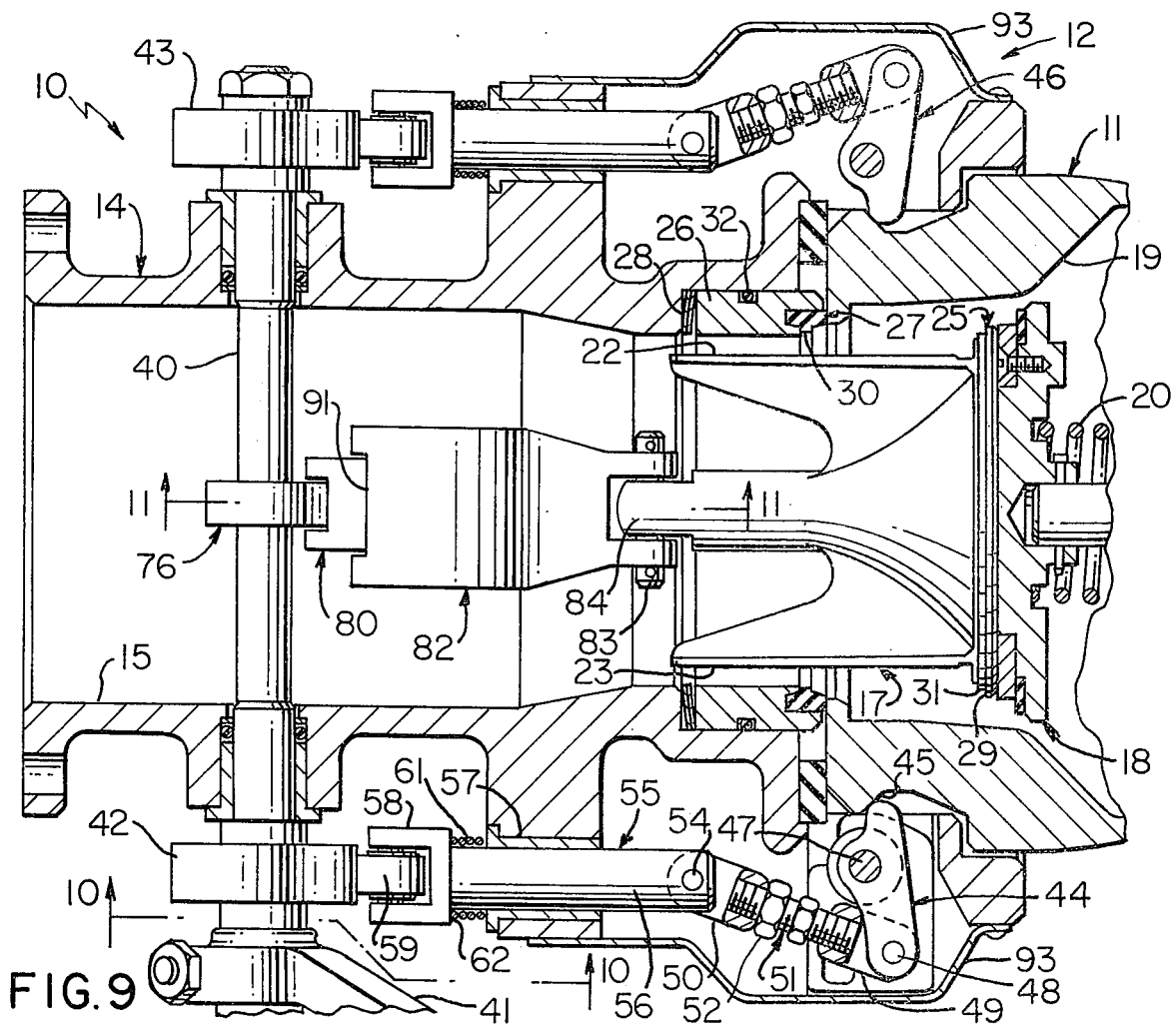
FIG. 9 is a longitudinal sectional view, partly in elevation, of the coupler with the adapter locked to the coupler and similar to FIG. 5 but showing the poppet valve in the coupler moved to its open position in which it opens the valve in the adapter.

Referring to the drawings and particularly FIGS. 1, 5, and 9, there is shown a dry break coupler 10 for receiving an adapter 11 (see FIGS. 5 and 9) therein to form a coupling device 12. The coupler 10 includes a body 14 having a longitudinal passage 15 of circular cross section extending therethrough.

The body 14 has a conduit connected at its end 16, which is opposite to the end receiving the adapter 11, to receive a fluid such as gasoline, for example, under pressure for flow through the passage 15. A poppet valve 17 is slidably disposed within the passage 15 to block flow therethrough when the poppet valve 17 is closed.

When the poppet valve 17 is moved to its open position (see FIG. 9), it opens a resiliently biased valve 18 in a passage 19 in the adapter 11 to enable the high pressure fluid to flow through the communicating passages 15 and 19 to a tank, for example, with which the passage 19 of the adapter 11 communicates. The tank could be that of a gasoline truck, for example. The valve 18 is biased to its closed position by a spring 20.

The poppet valve 17 includes a body 21 having three equally angularly spaced guide legs (two shown at 22 and 23) extending therefrom. The body 21 of the poppet valve 17 has a circular stepped seat 25 at its end remote from the guide legs.

The guide legs of the body 21 of the poppet valve 17 are in sliding engagement with the inner surface of a seal cylinder 26, which is slidably disposed within the body 14 of the coupler 10 and has an annular T-shaped nose seal 27 on its end. Wave springs 28 continuously urge the seal cylinder 26 to the right (as viewed in FIGS. 1, 5, and 9).

The stepped seat 25 of the body 21 has a flat surface 29 acting against a surface of an annular portion 30 of the nose seal 27 to form a seal therebetween when the poppet valve 17 is in its closed position. A circular surface 31 of the stepped seat 25 engages the inner surface of the annular portion 30 of the nose seal 27 to limit the compression of the nose seal 27, which is formed of a suitable rubber such as Viton, for example, by the surface 29 of the stepped seat 25 of the poppet valve body 21 to prevent oversqueezing and extrusion of the nose seal 27 from the seal cylinder 26. An O-ring 32 is supported within the seal cylinder 26 for preventing leakage between the coupler body 14 and the outer surface of the slidable seal cylinder 26.

When the adapter 11 is moved into the coupler body 14 for locking thereto as shown in FIG. 5, an annular surface 33 of the nose seal 27 engages a portion of the adapter 11 to form a seal therebetween. This sealing of the surface 33 of the nose seal 27 against the adapter 11 prevents any fluid from entering the space between the coupler body 14 and the adapter 11 when the poppet valve 17 is moved to its open position of FIG. 9 and opens the valve 18 to allow fluid to flow from the passage 15 in the coupler body 14 to the passage 19 in the adapter 11.

A gasket 34, which is preferably formed of rubber, is supported on the coupler body 14 to engage a surface 35 of the adapter 11 to form a seal therebetween. This seal between the gasket 34 and the surface 35 of the adapter 11 is a backup seal if the sealing of the surface 33 of the nose seal 27 against the adapter 11 should fail.

The locking of the adapter 11 to the coupler body 14, the opening of the poppet valve 17, the closing of the poppet valve 17, and the unlocking of the adapter 11 from the coupler body 14 are controlled through an actating shaft 40, which is rotatably supported in the coupler body 14. A handle 41 is attached to one end of the shaft 40 to rotate the shaft 40 clockwise to lock the adapter 11 to the coupler body 14 and then open the poppet valve 17 and to rotate the shaft 40 counterclockwise to close the poppet valve 17 and then to unlock the adapter 11 from the coupler body 14.

The shaft 40 has a pair of cams 42 and 43 mounted adjacent opposite ends thereof on flat portions of the shaft 40. The cams 42 and 43 have the same profile.

The cam 42 cooperates with a linkage mechanism to cause movement of a cam arm 44 into an annular groove 45 of the adapter 11 to lock the adapter 11 to the coupler body 14. Similarly, the cam 43 cooperates with a linkage mechanism to cause movement of a cam arm 46 into the annular groove 45 of the adapter 11 to lock the adapter 11 to the coupler body 14. Since the linkage mechanisms between the cam 42 and the cam arm 44 and between the cam 43 and the cam arm 46 are the same, the various elements will be described only for the linkage mechanism between the cam 42 and the cam arm 44.

Figure 2:
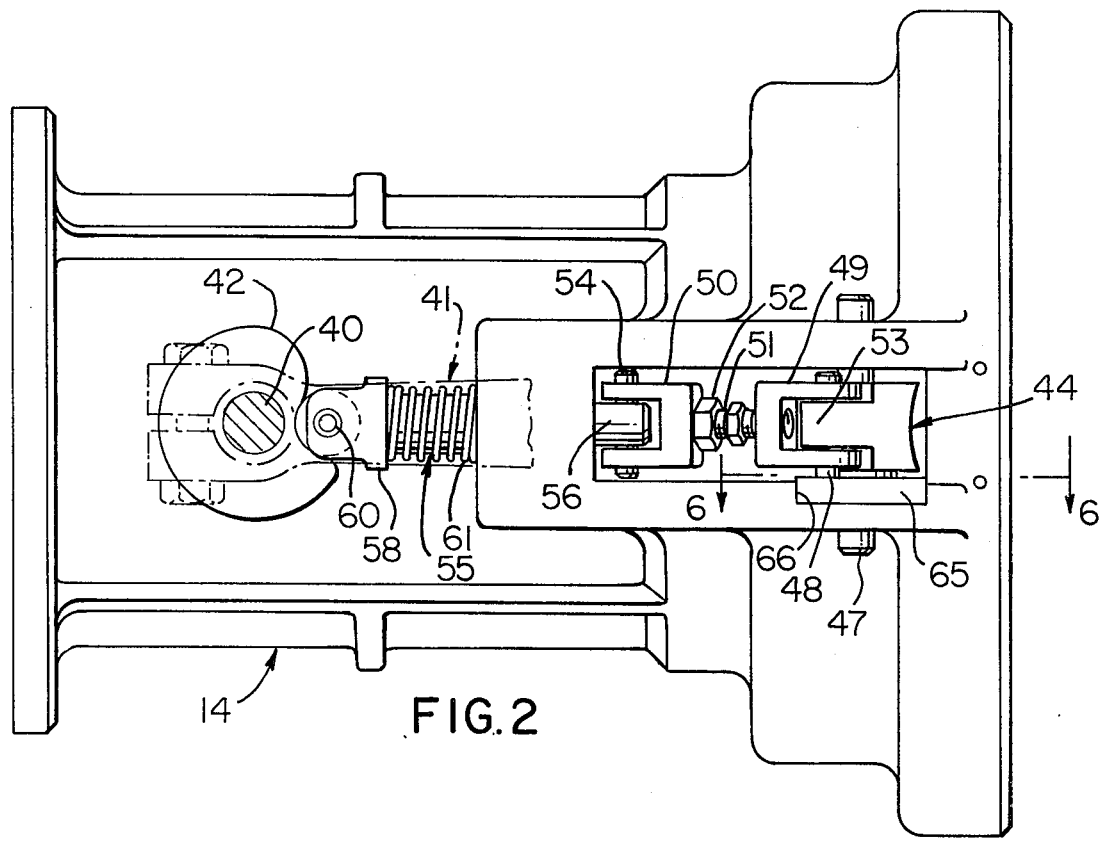
FIG. 2 is an elevational view, partly in section, of the coupler of FIG. 1 taken along line 2—2 of FIG. 1 with a protective plate removed.

The cam arm 44 is pivotally mounted on a pin 47, which is supported in bifurcated portions of the coupler body 14 as shown in FIG. 2. The cam arm 44 is pivotally connected by a pin 48 (see FIGS. 1, 5, and 9) to a U-shaped link 49, which is connected to a U-shaped link 50 by an adjusting screw 51 having threads of different pitch disposed within the link 49 and within the link 50 with the threads within the link 49 having the finer pitch. Accordingly, precise adjustment of the length of the linkage mechanism is obtained through threading the adjusting screw 51 into the one of the links 49 and 50 and out of the other of the links 49 and 50. A jam nut 52 locks the adjusting screw 51 in the desired position.

As shown in FIG. 2, the U-shaped link 49 has a reduced portion 53 of the cam arm 44 disposed between its legs. The adjusting screw 51 is threaded into the connecting portion between the legs of the link 49.

The link 50 is pivotally connected by a pin 54 to one end of a holder 55, which has a cylindrical portion 56 slidably supported in a bushing 57 in the coupler body 14. One end of the cylindrical portion 56 of the holder 55 is disposed between the legs of the link 50 and has the pivot pin 54 passing therethrough.

The holder 55 has a U-shaped end 58 within which a cam follower 59 is disposed. The cam follower 59, which is preferably a roller bearing, is rotatably connected to a pin 60 (see FIG. 1) to the legs of the U-shaped end 58 of the holder 55. A spring 61 is disposed between the surface 62 of the U-shaped end 58 of the holder 55 and the bushing 57 to continuously urge the cam follower 59 into engagement with the cam 42.

Figure 6:
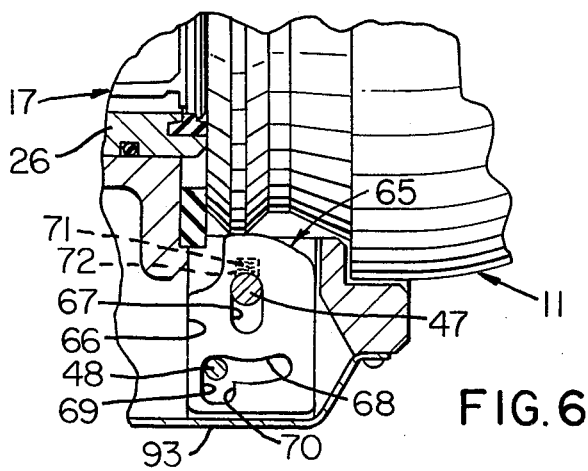
FIG. 6 is a fragmentary longitudinal sectional view, partly in elevation, of portions of the coupler and the adapter to show the adapter disposed within the coupler with the locking linkage omitted and taken along line 6—6 of FIG. 2.

An interlock 65 (see FIGS. 2 and 6) is slidably disposed within a slot 66 in one of the bifurcated portions of the coupler body 14. As shown in FIG. 6, the interlock 65 has an elongated slot 67 through which the pin 47 extends. The interlock 65 also has an L-shaped slot comprising a curved slot 68 and an enlarged slot 69 with a shoulder 70 at the junction therebetween. The pin 48 is always disposed in either the curved slot 68 or the enlarged slot 69.

A spring 71, which is disposed within a recess 72 in the interlock 65 communicating with the slot 67, has one end engaging the pin 47 and its other end abutting the bottom of the recess 72. Thus, the spring 71 continuously urges the interlock 65 to the position shown in FIG. 1 when the adapter 11 is not disposed within the coupler body 14.

When the interlock 65 is in the position of FIG. 1, the pin 48, which connects the cam arm 44 to the link 49, engages the shoulder 70 of the interlock 65 to prevent any movement of the linkage mechanism between the cam 42 and the cam arm 44 so that the actuating shaft 40 cannot be rotated by the handle 41 at this time. Thus, the cam arms 44 and 46 cannot be rotated to their locking positions before the adapter 11 is disposed in the coupler body 14 and the poppet valve 17 cannot be moved to its open position since the poppet valve 17 also is caused to move by the actuating shaft 40 after the cam arms 44 and 46 have been moved to their locking positions.

As the adapter 11 enters the coupler body 14, the interlock 65 is moved outwardly against the force of the spring 71 by the adapter 11 to the position shown in FIGS. 5, 6, and 9. As shown in FIG. 6, this position of the interlock 65 results in the pin 48 no longer engaging the shoulder 70 but being disposed in the portion of the enlarged slot 69 forming a continuation of the curved slot 68 so that the pin 48 can move from the enlarged slot 69 to the curved slot 68 when the shaft 40 is rotated clockwise. Thus, when the interlock 65 is moved against the force of the spring 71 by the adapter 11, the shaft 40 can be rotated by the handle 41.

The poppet valve 17 has its body 21 connected to the actuating shaft 40 through a linkage assembly 75. The linkage assembly 75 is constructed so that the poppet valve body 21 is not moved by clockwise rotation of the shaft 40 until after the cam arms 44 and 46 have been moved to their locking positions as shown for the cam arm 44 in FIG. 5.

The linkage assembly 75 includes a drive link 76 (see FIGS. 4, 8, 9, and 11), which is mounted on a pair of flat portions 77 of the actuating shaft 40 and retained thereon by a set screw 78 engaging one of the flat portions 77. The drive link 76 is pivotally connected through a pin 79 to a yoke 80.

The yoke 80 includes a curved portion 81, which cooperates with a link 82. The link 82 is pivotally connected by a pin 83 to a stem 84 of the poppet valve body 21.

The curved portion 81 of the yoke 80 has a V-shaped detent 85 for locking engagement with a ball 86, which is supported in a longitudinal passage 87 in the link 82. The ball 86 is resiliently biased into engagement with the V-shaped detent 85 by a spring 88. A retainer 89, which is a set screw, retains the spring 88 within the passage 87.

Figure 4:
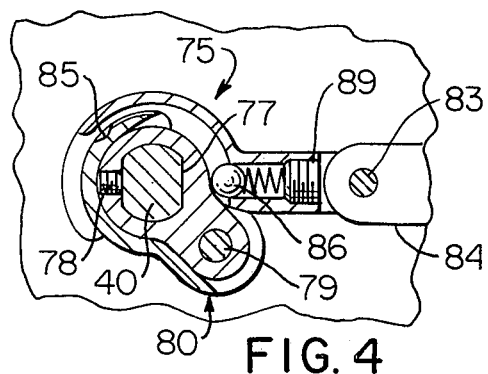
FIG. 4 is a fragmentary sectional view of a linkage assembly for connecting a poppet valve of the coupler to an actuating shaft and taken along line 4—4 of FIG. 1.
Figure 8:
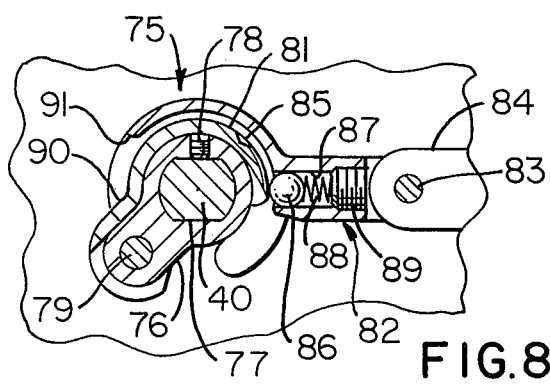
FIG. 8 is a fragmentary sectional view of the linkage assembly for connecting the poppet valve of the coupler to the actuating shaft and similar to FIG. 4 but taken along line 8—8 of FIG. 5.

Accordingly, when the shaft 40 is rotated clockwise by the handle 41 to lock the adapter 11 to the coupler body 14, the flat portions 77 of the shaft 40 rotate from the position of FIG. 4 to the position of FIG. 8. In this rotation, the yoke 80 rotates with the shaft 40 and the drive link 76 so that there is no pivoting between the drive link 76 and the yoke 80 about the pivot pin 79. This 90° of clockwise rotation of the shaft 40 moves the cams 42 and 43 from the position of FIG. 2 to the position of FIG. 7 whereby the cam arms 44 and 46 lock the adapter 11 to the coupler body 14.

Thus, the adapter 11 is locked to the coupler body 14 before there is any movement of the poppet valve 17 to its open position. The shaft 40 is rotated through approximately 225° from the position shown in FIG. 8 to move the poppet valve 17 to its open position.

When the shaft 40 is rotated approximately 45° clockwise from the position of FIG. 8, a portion 90 of the yoke 80 engages a surface 91 of the link 82 to provide a positive driving engagement therebetween for the remainder of the clockwise rotation of the shaft 40. At the same time, the detent 85 in the curved portion 81 of the yoke 80 has the ball 86 disposed therein.

During the remaining 180° of clockwise rotation of the shaft 40 after the portion 90 of the yoke 80 engages the surface 91 of the link 82, there is relative pivoting between the drive link 76 and the yoke 80 about the pin 79 to move the poppet valve 17 from its closed position to its open position. During this 180° of clockwise rotation of the shaft 40, the pin 79 rotates clockwise 180° about the axis of the shaft 40 until the pin 79 reaches the position of FIG. 11. The positive driving engagement between the portion 90 of the yoke 80 and the surface 91 of the link 82 pushes the poppet valve 17 to its open position since the engagement of the guide legs (two shown at 22 and 23) of the poppet vave body 21 with the seal cylinder 26 allows the poppet valve 17 to move only axially.

With the poppet valve 17 in its open position, the rotary axis of the shaft 40 is approximately 5° overcenter relative to the pin 79 as show in FIG. 11. This prevents any accidental closing of the poppet valve 17.

With the poppet valve 17 in its open position, the adapter 11 cannot be unlocked through any accidental disconnection. Instead, it is necessary for the handle 41 to rotate the shaft 40 counterclockwise so that the poppet valve 17 is first closed. This requires approximately 180° of counterclockwise rotation of the shaft 40.

Figure 7:
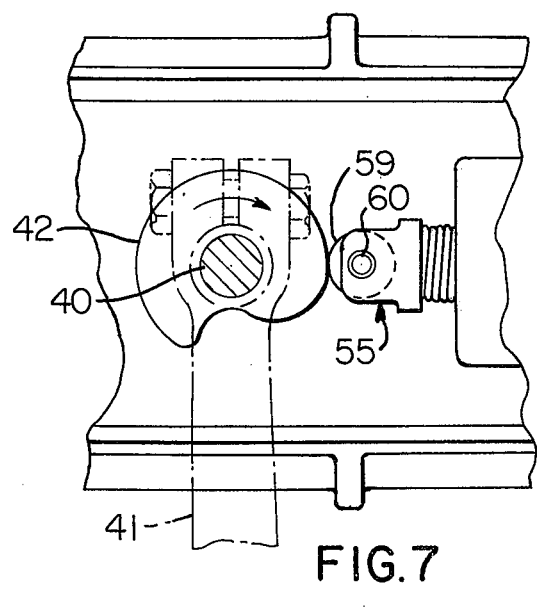
FIG. 7 is a fragmentary elevational view of a portion of the coupler of FIG. 5 and similar to FIG. 2 but taken along line 7—7 of FIG. 5 to show the position of a cam for the locking linkage when the adapter is locked to the coupler and the poppet valve of the coupler is closed.

Another 45° of counterclockwise rotation of the shaft 40 results in the linkage assembly 75 being arranged as shown in FIG. 8. In this position, the detent 85 is no longer receiving the ball 86 and the portion 90 of the yoke 80 is no longer engaging the surface 91 of the link 82. This position of the cam 42 is shown in FIG. 7.

During the final 90° of counterclockwise rotation of the shaft 40 by the handle 41, the profiles of the cams 42 and 43 cuse the cam arms 44 and 46, respectively, to be withdrawn from locking engagement with the adapter 11 by the spring 61 acting on the end 58 of the holder 55. As a result, the adapter 11 is released from the coupled body 14.

Each of the cam arms 44 and 46 has a protective plate 93 disposed thereover as shown in FIGS. 1 and 3. Each of the protective plates 93 is secured at one end by a pair of screws 94 to the coupler body 14 and adjacnet its other end by screws (not shown) to the bifurcated portions of the coupler body 14 between which the cam arms 44 and 46 are disposed.

Considering the operation of the present invention, the adapter 11 is disposed within the coupler body 14 as shown in FIG. 5. As the adapter 11 enters the coupler body 14, the interlock 65 is moved from the position of FIG. 1 to that of FIG. 5 by the adapter 1 overcoming the force of the spring 71.

This movement of the interlock 65 causes the pin 48 to no longer engage the shoulder 70 at the junction of the curved slot 68 and the enlarged slot 69. The pin 48 is disposed as shown in FIG. 6 so that the pin 48 is free to move from the enlarged slot 69 to the curved slot 68.

Thus, with the pin 48 disposed in the enlarged slot 69 as shown in FIG. 6, the handle 41 can be turned to rotate the shaft 40 clockwise. Clockwise rotation of the shaft 40 through 90° moves the cam arms 44 and 46 into engagement with the annular groove 45 of the adapter 11 to lock the adapter 11 to the coupler body 14.

Continued clockwise rotation of the shaft 40 by the handle 41 results in the linkage assembly 75 moving from the position of FIG. 8 to the position of FIG. 11. During the initial 90° clockwise rotation of the shaft 40, the linkage assembly 75 moved from the position of FIG. 4 to the position of FIG. 8. During the final 180° of clockwise rotation of the shaft 40 by the handle 41, the poppet valve 17 is moved from its fully closed position to its fully open position.

Whenever it is desired to stop fluid flow through the coupler body 14 and the adapter 11, the shaft 40 is rotated counterclockwise. Counterclockwise rotation of the shaft 40 through 180° closes the poppet valve 17. An additional 45° of counterclockwise rotation of the shaft 40 is required before the cam arms 44 and 46 start to move to their unlocking positions due to the profiles of the cams 42 and 43, respectively.

During the final 90° of counterclockwise rotation, the cam arms 44 and 46 are withdrawn from the annular groove 45 of the adapter 11. Then, the adapter 11 can be removed from the coupler body 14.

When the adapter 11 is withdrawn from the coupler body 14, the interlock 65 is biased by the spring 71 to return to the position of FIG. 1 and remain therein. When this occurs, the pin 48 abuts the shoulder 70 in the interlock 65 to lock the shaft 40 against rotation.

While the present invention has shown only the interlock 65 for cooperation with the pin 48 of the cam arm 44, it should be understood that the cam arm 46 could have a similar interlock cooperating with its pivot pin. However, the single interlock 65 prevents any rotation of the shaft 40 when desired so that the two interlocks are not required.

An advantage of this invention is that it insures that an adapter is locked to a dry break coupler before the poppet valve in the coupler is opened and the poppet valve is closed before the adapter is unlocked from the coupler. Another advantage of this invention is that is prevents any inadvertent disconnection of the adapter from the coupler during fluid flow from the coupler to the adapter.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A coupler for receiving an adapter or the like having a passage therein and valve means to close the passage, said coupler including a body, means to lock and unlock the adapter to said body, said locking and unlocking means being resiliently urged into its unlocking position, said body having a passage therein, valve means in said body passage and movable to an open position to provide communication between said body passage and the adapter passage, actuating means to move said valve means between its open and closed positions and to move said locking means to its locking or unlocking position, said valve means causing movement of the valve means in the adapter passage to an open position when said valve means is moved to its open position by said actuating means, and latch means to prevent movement of said locking and unlocking means until said body has received the adapter in the position in said body in which said locking and unlocking means can lock the adapter to said body, said latch means preventing said actuating means from moving said valve means until said locking and unlocking means has locked the adapter to said body.

2. The coupler according to claim 1 in which said actuating means includes a rotatable shaft rotatably supported by said body, a cam mounted on said rotatable shaft for rotation therewith, and said cam having a profile to prevent movement of said locking and unlocking means in response to rotation of said rotatable shaft to unlock the adapter from said body until said actuating means has moved said valve means to its closed position.

3. The coupler to claim 2 in which said locking means unlocking means includes linkage means, a locking arm for cooperation with the adapter to lock the adapter to said body, said locking arm being movable in response to movement of said linkage means, and said linkage means having means cooperating with said cam for movement in response to rotation of said rotatable shaft in accordance with the profile of said cam.

4. The coupler according to claim 3 in which said latch means includes rotation prevention means cooperating with said linkage means of said locking and unlocking means to prevent rotation of said rotatable shaft until said body has received the adapter in the position in said body in which said locking arm can lock the adapter to said body.

5. The coupler according to claim 4 in which said latch means includes resiliently biased means movable in response to the adapter being received in said body in the locking position to allow rotation of said rotatable shaft.

6. The coupler according to claim 5 in which said actuating means includes a first link connected to said rotatable shaft for rotation therewith, a second link connected to said valve means, and means cooperating with said first and second links to cause movement of said second link in response to rotation of said first link only when said locking arm of said locking and unlocking means has locked the adapter to said body.

7. The coupler according to claim 6 in which said actuating means includes a yoke, means pivotally connecting said yoke to said first link and said yoke includes means to transmit rotary motion of said yoke into linear motion of said second link.

8. The coupler according to claim 7 including means to prevent accidental closing of said valve means when said valve means is in its open position, said accidental preventing means including said first link being disposed to cause the rotary axis of said shaft to be overcenter relative to said pivotal connecting means when said valve means is in its open position.

9. The coupler according to claim 7 in which said transmitting means including spaced first and second cooperating means on said yoke and said second link, said first cooperating means provides a positive driving engagement between said yoke and said first link and being effective only when sid locking and unlocking means has locked the adapter to said body, and said second cooperating means includes means to releasably lock said yoke to said second link.

10. The coupler according to claim 1 in which said actuating means includes a rotatable shaft rotatably supported by said body, a pair of cams mounted on said rotatable shaft for rotation therewith and in spaced relation to each other, said locking and unlocking means includes a pair of linkage means, a pair of locking arms for cooperation with the adapter to lock the adapter to said body, each of said locking arms being movable in response to movement of one of said linkage means, each of said linkage means having means cooperating with one of said cams, and each of said cams having the same profile with each of the profiles preventing movement of said cooperating linkage means in response to rotation of said rotatable shaft to unlock the adapter from said body until said cooperating means has moved said valve means to its closed position.

11. The coupler according to claim 10 in which said actuating means includes a first link connected to said rotatable shaft for rotation therewith, a second link connected to said valve means, and means cooperating with said first and second links to cause movement of said second link in response to rotation of said first link only when said locking arms of said locking and unlocking means have locked the adapter to said body.

12. The coupler according to claim 11 in which said actuating means includes a yoke, means pivotally connecting said yoke to said first link, and said yoke includes means to transmit rotary motion of said yoke into linear motion of said second link.

13. The coupler according to claim 12 including means to prevent accidental closing of said valve means when said valve means is in its open position, said accidental preventing means including said first link being disposed to cause the rotary axis of said shaft to be overcenter relative to said pivotal connecting means when said valve means is in its open position.

14. The coupler according to claim 12 in which said transmitting means includes spaced first and second cooperating means on said yoke and said second link, said first cooperating means provides a positive driving engagement between said yoke and said first link and being effective only when said locking and unlocking means has locked the adapter to said body, and said second cooperating means includes means to releasably lock said yoke to said second link.

15. The coupler according to claim 1 in which said actuating means includes a rotatable shaft rotatably supported by said body, said additional means includes means to cause movement of said locking and unlocking means in response to rotation of said rotatable shaft, means connecting said rotatable shaft to said valve means, and means including first means to prevent rotation of said rotatable shaft until said body has received the adapter in the position in which said locking and unlocking means can lock the adapter to said body and second means to prevent movement of said valve means by said connecting means until said locking an unlocking means has locked the adapter to said body.

16. The coupler according to claim 15 in which said connecting means includes a first ink connected to said rotatable shaft for rotation therewith, a second link connected to said valve means, and means cooperating with said first and second links to cause movement of said second link in response to rotation of said first link only when said locking and unlocking means has locked the adapter to said body.

17. The coupler according to claim 16 in which said connecting means includes a yoke, means pivotally connecting said yoke to said first link, and said yoke includes means to transmit rotary motion of said yoke into linear motion of said second link.

18. The coupler according to claim 17 including means to prevent accidental closing of said valve means when said valve means is in its open position, said accidental preventing means including said first link being disposed to cause the rotary axis of said shaft to be overcenter relative to said pivotal connecting means when said valve means is in its open position.

19. The coupler according to claim 17 in which said transmitting means includes spaced first and second cooperating means on said yoke and said second link said first cooperating means provides a positive driving engagement between said yoke and said first link and being effective only when said locking and unlocking means has locked the adapter to said body, and said second cooperating means includes means to releasably lock said yoke to said second link.

* * * * *